(12) United States Patent
Labrunie

(10) Patent No.: US 10,836,886 B2
(45) Date of Patent: Nov. 17, 2020

(54) RUBBER COMPOSITION COMPRISING A VERY HIGH SPECIFIC SURFACE AREA SILICA AND A LOW GLASS TRANSITION TEMPERATURE HYDROCARBON RESIN

(71) Applicant: COMPAGNIE GENERALE DES ETABLISSEMENTS MICHELIN, Clermont-Ferrand (FR)

(72) Inventor: Philippe Labrunie, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 277 days.

(21) Appl. No.: 15/740,399

(22) PCT Filed: Jun. 30, 2016

(86) PCT No.: PCT/EP2016/065408
§ 371 (c)(1),
(2) Date: Dec. 28, 2017

(87) PCT Pub. No.: WO2017/001616
PCT Pub. Date: Jan. 5, 2017

(65) Prior Publication Data
US 2018/0186979 A1    Jul. 5, 2018

(30) Foreign Application Priority Data

Jul. 2, 2015   (FR) ..................................... 15 56233

(51) Int. Cl.
| | | |
|---|---|---|
| *C08L 9/06* | (2006.01) | |
| *C08K 3/36* | (2006.01) | |
| *B60C 1/00* | (2006.01) | |
| *C08L 57/02* | (2006.01) | |
| *C08L 9/00* | (2006.01) | |
| *C08K 3/04* | (2006.01) | |
| *C08K 5/01* | (2006.01) | |
| *C08L 65/00* | (2006.01) | |

(52) U.S. Cl.
CPC .............. *C08L 9/06* (2013.01); *B60C 1/0016* (2013.01); *C08K 3/04* (2013.01); *C08K 3/36* (2013.01); *C08K 5/01* (2013.01); *C08L 9/00* (2013.01); *C08L 57/02* (2013.01); *C08L 65/00* (2013.01); *C08K 2201/006* (2013.01); *C08L 2201/52* (2013.01)

(58) Field of Classification Search
CPC ............ C08K 3/36; C08L 9/06; B60C 1/0016
See application file for complete search history.

(56) References Cited

U.S. PATENT DOCUMENTS

| | | |
|---|---|---|
| 5,227,425 A | 7/1993 | Rauline |
| 5,665,812 A | 9/1997 | Gorce et al. |
| 5,821,290 A | 10/1998 | Labauze |
| 5,852,099 A | 12/1998 | Vanel |
| 5,900,449 A | 5/1999 | Custodero et al. |
| 5,925,713 A | 7/1999 | Labauze |
| 5,977,238 A | 11/1999 | Labauze |
| 6,013,718 A | 1/2000 | Cabioch et al. |
| 6,191,205 B1 | 2/2001 | Micouin et al. |
| 6,204,322 B1 | 3/2001 | Labauze |
| 6,313,205 B1 | 11/2001 | Chiron et al. |
| 6,344,506 B2 | 2/2002 | Vasseur |
| 6,420,488 B1 | 7/2002 | Penot |
| 6,503,973 B2 | 1/2003 | Robert et al. |
| 6,536,492 B2 | 3/2003 | Vasseur |
| 6,765,045 B1 | 7/2004 | Daniel et al. |
| 6,774,255 B1 | 8/2004 | Tardivat et al. |
| 6,815,473 B2 | 11/2004 | Robert et al. |
| 7,217,751 B2 | 5/2007 | Durel et al. |
| 7,250,463 B2 | 7/2007 | Durel et al. |
| 7,300,970 B2 | 11/2007 | Durel et al. |
| 7,312,264 B2 | 12/2007 | Gandon-Pain |
| 7,335,692 B2 | 2/2008 | Vasseur et al. |
| 7,488,768 B2 | 2/2009 | Tardivat et al. |
| 7,491,767 B2 | 2/2009 | Durel et al. |
| 7,820,771 B2 | 10/2010 | Lapra et al. |
| 7,825,183 B2 | 11/2010 | Robert et al. |
| 7,834,074 B2 | 11/2010 | Brunelet et al. |
| 7,882,874 B2 | 2/2011 | Robert et al. |

(Continued)

FOREIGN PATENT DOCUMENTS

| | | |
|---|---|---|
| EP | 0 501 227 A1 | 9/1992 |
| EP | 0 692 492 A1 | 1/1996 |

(Continued)

OTHER PUBLICATIONS

Machine translation of FR 3 017 871 A1, published Aug. 28, 2015. (Year: 2015).*
Machine translation of JP 2007-321093, published Dec. 13, 2007. (Year: 2007).*
S. Brunauer, et al., "Adsorption of Gases in Multimolecular Layers", J. Am. Chem. Soc., vol. 60, pp. 309-319 (1938).
International Search Report dated Jul. 29, 2016, issued by EPO in connection with International Application No. PCT/EP2016/065408.

*Primary Examiner* — Vickey Nerangis
(74) *Attorney, Agent, or Firm* — Venable LLP

(57) ABSTRACT

A rubber composition is based on at least one diene elastomer, a reinforcing filler, a vulcanizing system and a plasticizing system, said reinforcing filler predominantly comprising, by weight, a silica with a very high specific surface area, with a CTAB specific surface area greater than 170 m$^2$/g, and said plasticizing system comprising at least more than 15 phr (parts by weight per hundred parts by weight of elastomer) of a hydrocarbon resin having a glass transition temperature (Tg) between −40° C. and 20° C.

50 Claims, No Drawings

(56) References Cited

U.S. PATENT DOCUMENTS

| | | |
|---|---|---|
| 8,344,063 B2 | 1/2013 | Marechal et al. |
| 8,455,584 B2 | 6/2013 | Robert et al. |
| 8,461,269 B2 | 6/2013 | Varagniat et al. |
| 8,492,475 B2 | 7/2013 | Araujo Da Silva et al. |
| 8,492,479 B2 | 7/2013 | Robert et al. |
| 8,883,929 B2 | 11/2014 | Gandon-Pain et al. |
| 8,993,664 B2 | 3/2015 | Miyazaki ............... 524/274 |
| 9,010,393 B2 | 4/2015 | Araujo Da Silva et al. |
| 9,670,291 B2 | 6/2017 | Marechal et al. |
| 2001/0034389 A1 | 10/2001 | Vasseur |
| 2001/0036991 A1 | 11/2001 | Robert et al. |
| 2001/0056138 A1 | 12/2001 | Vasseur |
| 2002/0183436 A1 | 12/2002 | Robert et al. |
| 2004/0051210 A1 | 3/2004 | Tardivat et al. |
| 2004/0127617 A1 | 7/2004 | Vasseur et al. |
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2006/0089445 A1 | 4/2006 | Gandon-Pain |
| 2007/0167557 A1 | 7/2007 | Dumke et al. |
| 2008/0009564 A1 | 1/2008 | Robert et al. |
| 2008/0132644 A1 | 6/2008 | Lapra et al. |
| 2008/0156404 A1 | 7/2008 | Brunelet et al. |
| 2009/0105398 A1* | 4/2009 | Hirabayashi ............ C08L 9/06 524/506 |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2010/0022714 A1 | 1/2010 | Varagniat et al. |
| 2010/0184912 A1 | 7/2010 | Marechal et al. |
| 2010/0204359 A1 | 8/2010 | Robert et al. |
| 2010/0249270 A1 | 9/2010 | Robert et al. |
| 2010/0252156 A1 | 10/2010 | Robert et al. |
| 2011/0021702 A1 | 1/2011 | Gandon-Pain et al. |
| 2012/0208948 A1 | 8/2012 | Gandon-Pain et al. |
| 2012/0252928 A1 | 10/2012 | Marechal et al. |
| 2013/0267640 A1 | 10/2013 | Lopez et al. |
| 2013/0274404 A1 | 10/2013 | Vasseur et al. |
| 2013/0296471 A1 | 11/2013 | Lesage et al. |
| 2014/0024745 A1 | 1/2014 | Vasseur et al. ............ 523/511 |
| 2014/0155521 A1 | 6/2014 | Miyazaki ............... 523/156 |
| 2014/0171557 A1 | 6/2014 | Ringot ..................... 524/83 |
| 2015/0322241 A1 | 11/2015 | Darnaud et al. ......... C08K 5/47 |
| 2016/0102194 A1* | 4/2016 | Kamada ............ B60C 1/0016 524/511 |
| 2016/0319116 A1 | 11/2016 | Labrunie et al. |
| 2017/0121490 A1* | 5/2017 | Miyazaki ............... B60C 1/00 |
| 2017/0204256 A1 | 7/2017 | Labrunie et al. |
| 2017/0204257 A1 | 7/2017 | Labrunie et al. |
| 2017/0218187 A1 | 8/2017 | Ringot ................. C08L 9/06 |
| 2018/0194934 A1 | 7/2018 | Varagniat et al. |

FOREIGN PATENT DOCUMENTS

| | | | |
|---|---|---|---|
| EP | 0 692 493 A1 | 1/1996 | |
| EP | 0 735 088 A1 | 10/1996 | |
| EP | 0 767 206 A1 | 4/1997 | |
| EP | 0 786 493 A1 | 7/1997 | |
| EP | 0 810 258 A1 | 12/1997 | |
| EP | 0 881 252 A1 | 12/1998 | |
| EP | 1 127 909 A1 | 8/2001 | |
| EP | 2 740 757 A1 | 6/2014 | |
| EP | 2 743 301 A1 | 6/2014 | |
| FR | 2740778 A1 | 5/1997 | |
| FR | 2765882 A1 | 1/1999 | |
| FR | 2 974 808 A1 | 11/2012 | |
| FR | 3017871 A1 * | 8/2015 | ............ C08K 5/01 |
| JP | 2001144262 A | 5/2001 | |
| JP | 2005213486 A | 8/2005 | |
| JP | 2007321093 A * | 12/2007 | |
| JP | 2012-121966 A | 6/2012 | |
| JP | 2012-136581 | 7/2012 | |
| WO | 97/36724 A2 | 10/1997 | |
| WO | 99/02590 A1 | 1/1999 | |
| WO | 99/02601 A1 | 1/1999 | |
| WO | 99/02602 A1 | 1/1999 | |
| WO | 09/06480 A1 | 2/1999 | |
| WO | 99/16600 A1 | 4/1999 | |
| WO | 00/05300 A1 | 2/2000 | |
| WO | 00/08301 A1 | 2/2000 | |
| WO | 01/92402 A1 | 12/2001 | |
| WO | 02/30939 A1 | 4/2002 | |
| WO | 02/31041 A1 | 4/2002 | |
| WO | 02/083782 A1 | 10/2002 | |
| WO | 02/088238 A1 | 11/2002 | |
| WO | 03/002648 A1 | 1/2003 | |
| WO | 03/002649 A1 | 1/2003 | |
| WO | 03/016387 A1 | 2/2003 | |
| WO | 2004/096865 A2 | 11/2004 | |
| WO | 2005/087859 A1 | 9/2005 | |
| WO | 2006/061064 A1 | 6/2006 | |
| WO | 2006/069792 A1 | 7/2006 | |
| WO | 2006/069793 A1 | 7/2006 | |
| WO | 2006/125532 A1 | 11/2006 | |
| WO | 2006/125533 A1 | 11/2006 | |
| WO | 2006/125534 A1 | 11/2006 | |
| WO | 2008/003434 A1 | 1/2008 | |
| WO | 2008/003435 A1 | 1/2008 | |
| WO | 2008/141702 A1 | 11/2008 | |
| WO | 2009/000750 A1 | 12/2008 | |
| WO | 2009/000752 A1 | 12/2008 | |
| WO | 2011/042507 A1 | 4/2011 | |
| WO | 2012/084847 A1 | 6/2012 | |
| WO | 2013/092523 A1 | 6/2013 | |

* cited by examiner

RUBBER COMPOSITION COMPRISING A VERY HIGH SPECIFIC SURFACE AREA SILICA AND A LOW GLASS TRANSITION TEMPERATURE HYDROCARBON RESIN

FIELD OF THE INVENTION

The invention relates to compositions, notably for tyres, and more particularly to compositions comprising a plasticizing system based on resin with a low glass transition temperature (Tg) and a specific silica as a reinforcing filler.

RELATED ART

Now that fuel economy and the need to protect the environment have become a priority, it has proved necessary to produce tyres that have reduced rolling resistance, without adversely affecting the other properties of the tyres.

In the field of reinforcing fillers, this has notably been made possible through the use, in the treads of said tyres, of novel rubber compositions reinforced with inorganic fillers, in particular with specific silicas of the highly dispersible type, capable of competing in terms of reinforcement with a conventional tyre-grade carbon black, while offering these compositions lower hysteresis, synonymous with lower rolling resistance for the tyres comprising them, as well as improved grip on wet, snow-covered or icy roads.

Treads with these highly dispersible silicas as filler (designated "HD" or "HDS" for "highly dispersible" or "highly dispersible silica"), usable for tyres with low rolling resistance, sometimes called "Green Tyres" for the energy saving offered to the user ("Green Tyre concept"), have been described extensively. Reference may notably be made to patent applications EP 501 227, EP 692 492, EP 692 493, EP 735 088, EP 767 206, EP 786 493, EP 881 252, WO99/02590, WO99/02601, WO99/02602, WO99/06480, WO00/05300, WO00/05301.

In particular, document WO2003/016387 describes compositions using a silica having a very high specific surface area, i.e. having a CTAB specific surface area greater than 170 m$^2$/g and notably between 170 and 250 m$^2$/g.

Usually in commercial tyres, an HD silica with a high specific surface area adopted as a reference in the field of "Green Tyres" is in particular "Zeosil 1165 MP" silica (BET surface area equal to about 160 m$^2$/g) marketed by the company Rhodia. By using this "Zeosil 1165 MP" silica it is possible to obtain a good compromise with respect to tyre performance, notably satisfactory wear resistance and rolling resistance.

The advantage of using a silica having a high specific surface area is mainly the possibility of increasing the number of bonds between the silica and the elastomer and therefore of increasing the level of reinforcement of the latter. That is why it appears advantageous to use, in rubber compositions for tyre treads, silicas having a high specific surface area, optionally above that used conventionally of the order of 160 m$^2$/g, notably to improve the wear resistance of these treads. However, dispersibility of the filler and increase of its specific surface area are considered to be contradictory characteristics. In fact, a large specific surface area assumes an increase in interactions between filler particles, and therefore poor dispersion of the latter in the elastomer matrix as well as more difficult application.

In the field of plasticizers and in particular plasticizing resins, the applicants have already described the use of high-Tg resins, as described in documents WO-2005/087859 or WO-2006/061064.

Some documents describe the use of low-Tg resins, for example in the document JP-2005213486, which proposes the use of low-Tg resin at a level between 0.5 and 5 phr to improve the building tack and the industrial feasibility of the compositions. The document US-2007/0167557 proposes the use of low-Tg resin at a level of 10 phr to improve the resistance to scaling. Moreover, document JP-2001144262 describes compositions with improved abrasion resistance and grip, and that comprise low-Tg resins.

Nevertheless, the manufacturers are always looking for solutions for simultaneously improving all the performance characteristics of compositions for tyres and notably the rolling resistance and dry road grip, at the same time as the hardness of the cured compositions, associated with vehicle handling and with drive comfort.

The applicants have now shown that particular compositions based on low-Tg resin, and silica having a very high specific surface area, provided an improved compromise, and synergy between many performance characteristics required for tyre compositions, i.e. rolling resistance, dry road grip, and hardness of the cured compositions.

BRIEF DESCRIPTION OF EMBODIMENTS OF THE INVENTION

The invention therefore relates to a rubber composition based on at least one diene elastomer, a reinforcing filler, a vulcanizing system and a plasticizing system, said reinforcing filler predominantly comprising, by weight, a silica with a very high specific surface area, with a CTAB specific surface area greater than 170 m$^2$/g, and said plasticizing system comprising at least more than 15 phr (parts by weight per hundred parts by weight of elastomer) of a hydrocarbon resin having a glass transition temperature (Tg) between −40° C. and 20° C.

The invention preferably relates to a composition as defined above, in which said diene elastomer is selected from the group consisting of polybutadienes, synthetic polyisoprenes, natural rubber, butadiene copolymers, isoprene copolymers and mixtures of these elastomers. Preferably, said diene elastomer is selected from the group consisting of polybutadienes, copolymers of butadiene and styrene, and mixtures of these elastomers.

The invention also preferably relates to a composition as defined above, in which the level of reinforcing filler is in the range from 30 to 200 phr, preferably from 45 to 170 phr, better still from 50 to 150 phr.

The invention preferably relates to a composition as defined above, in which the level of silica having a very high specific surface area is in the range from 25 to 180 phr, preferably from 40 to 160 phr, better still from 50 to 140 phr. Preferably, the silica having a very high specific surface area has a CTAB specific surface area in the range from 170 to 250 m$^2$/g, preferably from 180 to 240 m$^2$/g. Also preferably, the silica having a very high specific surface area has a BET specific surface area in the range from 170 to 320 m$^2$/g, preferably from 200 to 300 m$^2$/g. Also preferably, the silica having a very high specific surface area has an average particle size (by weight), denoted by dw, in the range from 20 to 300 nm, preferably from 40 to 150 nm. More preferably, the silica having a very high specific surface area has a distribution of particle size dw such that dw≥(16 500/CTAB)−30. Also preferably, the silica having a very high specific surface area has a porosity that meets the criterion L/FI≥−0.0025 CTAB+0.85.

The invention preferably relates to a composition as defined above, which comprises carbon black as a minor reinforcing filler. Preferably, the level of carbon black is between 0 and 30 phr, preferably in the range from 1 to 10 phr, preferably from 1 to 5 phr.

The invention preferably relates to a composition as defined above, in which the level of hydrocarbon resin with Tg between −40° C. and 20° C. is in the range from 15 to 120 phr, preferably from 20 to 110 phr, more preferably from 25 to 90 phr. Preferably, the hydrocarbon resin mentioned above as a hydrocarbon resin with Tg between −40° C. and 20° C. has a Tg between −40° C. and 0° C., more preferably between −30° C. and 0° C. and even more preferably between −20° C. and 0° C. Also preferably, the hydrocarbon resin mentioned above as a hydrocarbon resin with Tg between −40° C. and 20° C. has a number-average molecular weight below 800 g/mol, preferably below 600 g/mol, more preferably below 400 g/mol. More preferably, the hydrocarbon resin mentioned above as a hydrocarbon resin with Tg between −40° C. and 20° C. has a softening point in the range from 0 to 50° C., preferably from 0 to 40° C., more preferably from 10 to 40° C., and preferably from 10 to 30° C. According to a preferred embodiment, the hydrocarbon resin mentioned above as a hydrocarbon resin with Tg between −40° C. and 20° C. has a polydispersity index (PDI) below 3, preferably below 2.

The invention preferably relates to a composition as defined above, which further comprises a plasticizing oil in the plasticizing system. Preferably, the plasticizing oil is selected from the group consisting of naphthenic oils, paraffinic oils, MES oils (Medium Extracted Solvates), TDAE oils (Treated Distillate Aromatic Extracts), mineral oils, vegetable oils, ether plasticizers, ester plasticizers, phosphate plasticizers, sulphonate plasticizers and mixtures of these compounds. Also preferably, the level of plasticizing oil is in the range from 2 to 50 phr, preferably from 5 to 30 phr.

The invention also preferably relates to a composition as defined above, which further comprises, in the combination of plasticizers, a resin with Tg above 20° C. Preferably, the level of hydrocarbon resin with Tg above 20° C. is in the range from 5 to 80 phr, preferably from 7 to 70 phr, better still from 10 to 65 phr. Preferably, the hydrocarbon resin mentioned above as a hydrocarbon resin with Tg above 20° C. has a Tg above 30° C. Preferably, the hydrocarbon resin mentioned above as a hydrocarbon resin with Tg above 20° C. has a number-average molecular weight between 400 and 2000 g/mol, preferably between 500 and 1500 g/mol. Also preferably, the hydrocarbon resin mentioned above as a hydrocarbon resin with Tg above 20° C. has a polydispersity index (PDI) below 3, preferably below 2.

The invention preferably relates to a composition as defined above, in which the total level of plasticizers is greater than or equal to 25 phr, preferably in the range from 45 to 120 phr, more preferably from 50 to 100 phr, better still from 50 to 90 phr.

The invention also preferably relates to a composition as defined above, in which the levels of reinforcing filler and of plasticizer are such that the ratio of the total level of filler to the total level of plasticizer is in the range from 1.3 to 2, preferably from 1.3 to 1.8, better still from 1.4 to 1.7.

Moreover, the invention relates to a tyre comprising a composition as defined above, preferably in which said composition represents all or part of the tread.

Preferably, the tyre according to the invention will be selected from the tyres intended to equip a two-wheeled vehicle, a passenger vehicle, or else a "heavy goods vehicle" (i.e. underground train, bus, off-road vehicles and snowmobiles, means of road transportation such as lorries, tractors, trailers), or also aircraft, civil engineering, agricultural, or maintenance machinery.

DETAILED DESCRIPTION OF THE INVENTION

I—Constituents of the Composition

The rubber compositions according to the invention are based on at least one diene elastomer, a reinforcing filler, a vulcanizing system and a plasticizing system, said reinforcing filler predominantly comprising, by weight, a silica with a very high specific surface area, with a CTAB specific surface area greater than 170 $m^2/g$, and said plasticizing system comprising at least more than 15 phr (parts by weight per hundred parts by weight of elastomer) of a hydrocarbon resin having a glass transition temperature (Tg) between −40° C. and 20° C.

The expression "composition based on" means a composition comprising the mixture and/or the reaction product in situ of the different basic constituents used, certain of these constituents being able to react and/or being intended to react with one another, at least partially, during the various stages of manufacture of the composition, or during the subsequent curing, altering the composition as prepared initially. Thus, the compositions such as are used for the invention may be different in the non-crosslinked state and in the crosslinked state.

In the present description, unless expressly stated otherwise, all the percentages (%) stated are percentages by weight. Moreover, any range of values denoted by the expression "between a and b" represents the range of values from more than a to less than b (i.e. excluding the limits a and b) whereas any range of values denoted by the expression "from a to b" signifies the range of values extending from a to as far as b (i.e. including the strict limits a and b).

When reference is made to a "predominant" compound, this means, in the sense of the present invention, that this compound is predominant among the compounds of the same type in the composition, i.e. it is the one that represents the largest amount by weight among the compounds of the same type. Thus, for example, a predominant polymer is the polymer representing the largest weight relative to the total weight of the polymers in the composition. Similarly, a filler that is said to be predominant is the one representing the largest weight among the fillers in the composition. For example, in a system comprising a single polymer, the latter is predominant in the sense of the present invention; and in a system comprising two polymers, the predominant polymer represents more than half the weight of the polymers. Conversely, a "minor" compound is a compound that does not represent the largest fraction by weight among the compounds of the same type.

In the present application, when reference is made to a ratio of the amounts of a compound A and of a compound B, or a ratio of the level of a compound A to the level of a compound B, it is always the ratio in the mathematical sense of the amount of compound A to the amount of compound B.

I-1 Diene Elastomer

The compositions may contain a single diene elastomer or a mixture of several diene elastomers.

Elastomer (or "rubber", the two terms being regarded as synonyms) of the "diene" type, is intended to mean in a known manner an (meaning one or more) elastomer obtained at least partly (i.e. a homopolymer or a copolymer)

from diene monomers (monomers bearing two carbon-carbon double bonds, conjugated or non-conjugated).

The diene elastomers can be classified in two categories: "essentially unsaturated" or "essentially saturated". "Essentially unsaturated" generally means a diene elastomer obtained at least partly from conjugated diene monomers, having a level of units of diene origin (conjugated dienes) that is above 15% (mol %); thus, diene elastomers such as butyl rubbers or copolymers of dienes and alpha-olefins of the EPDM type are not included in the above definition and may notably be described as "essentially saturated" diene elastomers (low or very low level of units of diene origin, always below 15%). In the category of "essentially unsaturated" diene elastomers, "highly unsaturated" diene elastomer means in particular a diene elastomer having a level of units of diene origin (conjugated dienes) that is above 50%.

Based on these definitions, diene elastomer that may be used in the compositions according to the invention means more particularly:
(a) any homopolymer obtained by polymerization of a conjugated diene monomer having from 4 to 12 carbon atoms;
(b) any copolymer obtained by copolymerization of one or more conjugated dienes with one another or with one or more aromatic vinyl compounds having from 8 to 20 carbon atoms;
(c) a ternary copolymer obtained by copolymerization of ethylene, of an α-olefin having 3 to 6 carbon atoms with a non-conjugated diene monomer having from 6 to 12 carbon atoms, for example the elastomers obtained from ethylene, from propylene with a non-conjugated diene monomer of the aforementioned type such as notably hexadiene-1,4, ethylidene norbornene, dicyclopentadiene;
(d) a copolymer of isobutene and isoprene (butyl rubber), as well as the halogenated versions, in particular chlorinated or brominated, of this type of copolymer.

Although it applies to any type of diene elastomer, an expert in the area of tyres will understand that the present invention is preferably carried out with essentially unsaturated diene elastomers, in particular of type (a) or (b) above.

Notably the following are suitable as conjugated dienes: butadiene-1,3, 2-methyl-1,3-butadiene, 2,3-di(C1-C5 alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene, 2,4-hexadiene. For example the following are suitable as aromatic vinyl compounds: styrene, ortho-, meta-, para-methylstyrene, the "vinyl-toluene" commercial mixture, para-tert-butylstyrene, methoxystyrenes, chlorostyrenes, vinylmesitylene, divinylbenzene, vinylnaphthalene.

The copolymers may contain between 99 and 20 wt % of diene units and between 1 and 80 wt % of aromatic vinyl units. The elastomers may have any microstructure, which depends on the polymerization conditions used, notably the presence or absence of a modifying and/or randomizing agent and the amounts of modifying and/or randomizing agent used. The elastomers may be for example of the block, random, sequenced, or microsequenced type, and may be prepared in dispersion or in solution; they may be coupled and/or star-branched or else functionalized with a coupling agent and/or a star-branching agent or a functionalizing agent. For coupling to carbon black, we may mention for example functional groups comprising a C—Sn bond or amino functional groups such as aminobenzophenone for example; for coupling to an inorganic reinforcing filler such as silica, we may mention for example silanol or polysiloxane functional groups having a silanol end group (as described for example in FR 2 740 778, U.S. Pat. No. 6,013,718 and WO 2008/141702), alkoxysilane groups (as described for example in FR 2 765 882 or U.S. Pat. No. 5,977,238), carboxyl groups (as described for example in WO 01/92402 or U.S. Pat. No. 6,815,473, WO 2004/096865 or US 2006/0089445) or else polyether groups (as described for example in EP 1 127 909, U.S. Pat. No. 6,503,973, WO 2009/000750 and WO 2009/000752). Other examples of functionalized elastomers that may be mentioned are elastomers (such as SBR, BR, NR or IR) of the epoxidized type.

These functionalized elastomers may be used, blended with one another or with non-functionalized elastomers. For example, it is possible to use a silanol or polysiloxane functionalized elastomer having a silanol end group, mixed with an elastomer coupled and/or star-branched to tin (described in WO 11/042507), the latter representing a level from 5 to 50%, for example from 25 to 50%.

The polybutadienes are suitable, and especially those having a content (mol %) of -1,2 units between 4% and 80% or those having a content (mol %) of cis-1,4 above 80%, the polyisoprenes, the butadiene-styrene copolymers and in particular those having a Tg (glass transition temperature (Tg, measured according to ASTM D3418) between 0° C. and −70° C. and more particularly between −10° C. and −60° C., a styrene content between 5 and 60 wt % and more particularly between 20% and 50%, a content (mol %) of -1,2 bonds of the butadiene moiety between 4% and 75%, a content (mol %) of trans-1,4 bonds between 10% and 80%, the butadiene-isoprene copolymers and notably those having an isoprene content between 5 and 90 wt % and a Tg from −40° C. to −80° C., the isoprene-styrene copolymers and notably those having a styrene content between 5 and 50 wt % and a Tg between −5° C. and −60° C. In the case of the butadiene-styrene-isoprene copolymers, notably those are suitable having a styrene content between 5 and 50 wt % and more particularly between 10% and 40%, an isoprene content between 15 and 60 wt % and more particularly between 20% and 50%, a butadiene content between 5 and 50 wt % and more particularly between 20% and 40%, a content (mol %) of -1,2 units of the butadiene moiety between 4% and 85%, a content (mol %) of trans-1,4 units of the butadiene moiety between 6% and 80%, a content (mol %) of -1,2 plus -3,4 units of the isoprene moiety between 5% and 70% and a content (mol %) of trans-1,4 units of the isoprene moiety between 10% and 50%, and more generally any butadiene-styrene-isoprene copolymer having a Tg between −20° C. and −70° C.

To summarize, the diene elastomer of the composition is preferably selected from the group of highly unsaturated diene elastomers consisting of the polybutadienes (abbreviated to "BR"), the synthetic polyisoprenes (IR), natural rubber (NR), butadiene copolymers, isoprene copolymers and mixtures of these elastomers. Copolymers of this kind are more preferably selected from the group consisting of the butadiene-styrene copolymers (SBR), isoprene-butadiene copolymers (BIR), isoprene-styrene copolymers (SIR), isoprene-butadiene-styrene copolymers (SBIR), butadiene-acrylonitrile copolymers (NBR), butadiene-styrene-acrylonitrile copolymers (NSBR) or a mixture of two or more of these compounds.

According to a particular embodiment, the composition comprises from 50 to 100 phr of an SBR elastomer, whether it is an SBR prepared in emulsion ("ESBR") or an SBR prepared in solution ("SSBR").

According to another particular embodiment, the diene elastomer is an SBR/BR blend (mixture).

According to other possible embodiments, the diene elastomer is an SBR/NR (or SBR/IR), BR/NR (or BR/IR), or else SBR/BR/NR (or SBR/BR/IR) blend.

In the case of an SBR elastomer (ESBR or SSBR), notably an SBR is used having a medium styrene content, for example between 20 and 35 wt %, or a high styrene content, for example from 35 to 45%, a content of vinyl bonds of the butadiene moiety between 15% and 70%, a content (mol %) of trans-1,4 bonds between 15% and 75% and a Tg between −10° C. and −55° C.; such an SBR may advantageously be used mixed with a BR preferably having more than 90% (mol %) of cis-1,4 bonds.

According to another particular embodiment, the diene elastomer is a predominantly isoprene elastomer (i.e. whose fraction by weight of isoprene elastomer is the highest, compared to the fraction by weight of the other elastomers). "Isoprene elastomer" means, as is known, a homopolymer or a copolymer of isoprene, in other words a diene elastomer selected from the group consisting of natural rubber (NR), which may be plasticized or peptized, synthetic polyisoprenes (IR), various isoprene copolymers and mixtures of these elastomers. Among the isoprene copolymers, we may mention in particular the isobutene-isoprene copolymers (butyl rubber—IIR), isoprene-styrene copolymers (SIR), isoprene-butadiene copolymers (BIR) or isoprene-butadiene-styrene copolymers (SBIR). This isoprene elastomer is preferably natural rubber or a synthetic cis-1,4 polyisoprene; among these synthetic polyisoprenes, preferably polyisoprenes are used having a level (mol %) of cis-1,4 bonds above 90%, even more preferably above 98%.

Preferably, according to another embodiment, the rubber composition comprises predominantly (i.e. with the highest level by weight) a non-isoprene diene elastomer. "Non-isoprene diene elastomer" means, in the sense of the present application, an elastomer obtained at least partly (i.e. a homopolymer or a copolymer) from diene monomers (monomers bearing two carbon-carbon double bonds) other than isoprene. Thus, the non-isoprene diene elastomers in the sense of the present definition therefore also comprise copolymers comprising isoprene as co-monomer. Natural rubber and isoprene homopolymers (i.e. consisting of functionalized or unfunctionalized isoprene monomers) are excluded from the present definition. According to this preferred embodiment, all the elastomers mentioned above except natural rubber and polyisoprenes are suitable as a non-isoprene diene elastomer. Notably, it will be possible to use the non-isoprene diene elastomers preferably selected from the group of highly unsaturated diene elastomers consisting of the polybutadienes (abbreviated to "BR"), butadiene copolymers, isoprene copolymers and mixtures of these elastomers. Said copolymers are more preferably selected from the group consisting of butadiene-styrene copolymers (SBR), isoprene-butadiene copolymers (BIR), isoprene-styrene copolymers (SIR) and isoprene-butadiene-styrene copolymers (SBIR). Still according to this preferred embodiment, it will be understood that in the case of a blend of elastomers, the total level of so-called "non-isoprene" elastomers must be greater than the total level of the elastomers selected from the group consisting of natural rubber, synthetic polyisoprenes and mixtures thereof. Preferably, according to this embodiment, the level of non-isoprene diene elastomer is more than 50 phr, more preferably at least 60 phr, more preferably at least 70 phr, even more preferably at least 80 phr and very preferably at least 90 phr. In particular according to this embodiment, the level of non-isoprene diene elastomer is very preferably 100 phr.

According to another preferred embodiment of the invention, the rubber composition comprises a blend of a (one or more) so-called "high-Tg" diene elastomer having a Tg between −70° C. and 0° C. and of a (one or more) diene elastomer of "low Tg" between −110° C. and −80° C., more preferably between −105° C. and −90° C. The high-Tg elastomer is preferably selected from the group consisting of S-SBRs, E-SBRs, natural rubber, synthetic polyisoprenes (having a level (mol %) of cis-1,4 chains preferably above 95%), BIRs, SIRs, SBIRs, and mixtures of these elastomers. The low-Tg elastomer preferably comprises butadiene units at a level (mol %) equal to at least 70%; it preferably consists of a polybutadiene (BR) having a level (mol %) of cis-1,4 chains above 90%.

According to another particular embodiment of the invention, the rubber composition comprises for example between 30 and 90 phr, in particular between 40 and 90 phr, of a high-Tg elastomer blended with a low-Tg elastomer.

According to another particular embodiment of the invention, the diene elastomer of the composition according to the invention comprises a blend of a BR (as low-Tg elastomer) having a level (mol %) of cis-1,4 chains above 90%, with one or more S-SBRs or E-SBRs (as high-Tg elastomer(s)).

I-2 Reinforcing Filler

The composition according to the invention comprises, as the predominant reinforcing filler, a silica having a very high specific surface area as defined below. The composition may additionally comprise another reinforcing filler, as a minor reinforcing filler.

I-2.1 Silica Having a Very High Specific Surface Area

Characterization of the Silicas

The silicas described below consist in a known manner of agglomerates of particles, which can deagglomerate into these particles under the effect of an external force, for example under the action of mechanical work or ultrasound. The term "particle" used in the present application must be understood in its usual generic sense of aggregate (also called "secondary particle"), and not in the sense of elementary particle (also called "primary particle") that may possibly form, if applicable, a part of this aggregate; "aggregate" means, in a known manner, the indivisible whole (i.e. which cannot be cut, divided, shared) that is produced during synthesis of the filler, generally formed from elementary (primary) particles aggregated together. These silicas are characterized as indicated below.

Specific Surface Area:

The BET specific surface area ("area by weight") is determined by gas adsorption using the Brunauer-Emmett-Teller method described in "The Journal of the American Chemical Society" Vol. 60, page 309, February 1938), more precisely according to French standard NF ISO 9277 of December 1996 [multipoint (5-point) volumetric method—gas: nitrogen—degassing: 1 hour at 160° C.—range of relative pressure p/po: 0.05 to 0.17]

The CTAB specific surface area is the external surface area determined according to French standard NF T 45-007 of November 1987 (method B).

Granulometry:

The average size (by weight) of the particles, denoted by dw, is measured classically after dispersion, by ultrasonic deagglomeration, of the filler to be analysed in water. Measurement is performed by means of a centrifugal sedimentometer with X-ray detection of the "XDC" type ("X- ray Disk Centrifuge"), marketed by the company Brookhaven Instruments, according to the procedure presented below.

A suspension of 3.2 g of sample of silica to be analysed in 40 ml of water is prepared by the action for 8 minutes, at 60% power (60% of the max. position of the "output control"), of an ultrasonic probe of 1500 W (Vibracell ¾ inch sonicator marketed by the company Bioblock); after sonication, 15 ml of the suspension is put in the rotating disk; after sedimentation for 120 minutes, the distribution by weight of the particle sizes is calculated by the software of the "XDC" sedimentometer. The geometric mean by weight of the particle sizes ("geometric mean (Xg)" as designated by the software), denoted by dw, is calculated by the software from the following equation, in which mi represents the mass of all of the objects in the class of diameter di $$\log d_w = \frac{\sum_{i=1}^{n} m_i \log d_i}{\sum_{i=1}^{n} m_i},$$

Porosimetry:

The parameter L/FI characterizing the pore size distribution width is determined by mercury porosimetry. Measurement is performed using the PASCAL 140 and PASCAL 440 porosimeters marketed by ThermoFinnigan, by the following procedure: an amount of sample between 50 and 500 mg (in the present case 140 mg) is put in a measurement cell. This measurement cell is fitted on the measurement station of the PASCAL 140 apparatus. The sample is then degassed under vacuum, for the time required to reach a pressure of 0.01 kPa (typically of the order of 10 minutes). The measurement cell is then filled with mercury. The first part (pressures below 400 kPa) of the mercury intrusion curve Vp=f(P), where Vp is the volume of mercury intrusion and P is the pressure applied, is determined on the PASCAL 140 porosimeter. The measurement cell is then fitted on the measurement station of the PASCAL 440 porosimeter, and the second part of the mercury intrusion curve Vp=f(P) (pressures between 100 kPa and 400 MPa) is determined on the PASCAL 440 porosimeter. The porosimeters are used in "PASCAL" mode, for constant adjustment of the rate of mercury intrusion as a function of the variations in volume of intrusion. The rate parameter in "PASCAL" mode is fixed at 5. The pore radii Rp are calculated from the values of pressure P using the Washburn relation, shown below, assuming cylindrical pores, and selecting a contact angle θ equal to 140° and a surface tension γ equal to 480 dynes/cm.

Washburn Relation:

$$R_p = \frac{-2\gamma \cos\theta}{P}$$

The pore volumes Vp are referred to the weight of silica introduced and are expressed in cm³/g. The signal Vp=f(Rp) is smoothed by combining a logarithmic filter ("smooth dumping factor" filter parameter F=0.96) and a moving average filter ("number of points to average" filter parameter f=20). The pore size distribution is obtained by calculating the derivative dVp/dRp of the smoothed intrusion curve.

By definition, the fineness index FI is the value of pore radius (expressed in angströms) corresponding to the maximum of the pore size distribution dVp/dRp. L denotes the half-height width of the pore size distribution dVp/dRp. The pore size distribution width of the sample is then characterized using the parameter L/FI.

Surface Chemistry:

The number of silanols per nm2 is determined by grafting methanol on the surface of the silica. First, an amount of about 1 g of raw silica is suspended in 10 ml of methanol, in a 110 ml autoclave (Top Industrie, Ref: 09990009).

A magnetized bar is introduced and the reactor, sealed hermetically and heat-insulated, is heated to 200° C. (40 bar) on a heating magnetic stirrer for 4 hours. The autoclave is then cooled in a bath of cold water. The grafted silica is recovered by decanting and the residual methanol is evaporated under a nitrogen stream. Finally, the grafted silica is dried at 130° C. under vacuum for 12 hours. The carbon content is determined by an elemental analyser (NCS 2500 analyser from CE Instruments) on the raw silica and on the grafted silica. This carbon assay on the grafted silica must be carried out within 3 days of the end of drying. In fact, the humidity of the air or heat could cause hydrolysis of the methanol graft. The number of silanols per nm2 is calculated using the following formula:

$$N_{SiOH/nm^2} = \frac{(\%C_g - \%C_b) \times 6.023 \times 10^{23}}{S_{spe} \times 10^{18} \times 12 \times 100}$$

in which $N_{SiOH/nm^2}$ represents the number of silanols per nm² (SiOH/nm²), % Cg represents the percentage by weight of carbon present on the grafted silica, % Cb represents the percentage by weight of carbon present on the raw silica and $S_{spe}$ represents the BET specific surface area of the silica (m²/g).

Silica Having a Very High Specific Surface Area:

The composition according to the invention predominantly comprises, as reinforcing filler, a silica having a CTAB specific surface area greater than 170 m²/g. Preferably, the specific surface area of the silica is in the range from 170 m²/g to 250 m²/g, and more preferably from 180 to 240 m²/g.

Also preferably, the silica having a very high specific surface area has a BET specific surface area in the range from 170 to 320 m²/g, more preferably from 200 to 300 m²/g.

Preferably, the silicas of very high specific surface area advantageously also have an average size (by weight) of particles, denoted by dw, ranging from 20 to 300 nm, and at least one of the following characteristics, preferably two, and more preferably all three:

- a particle size distribution such that dw≥(16 500/CTAB)−30;
- a porosity meeting the criterion L/FI≥−0.0025 CTAB+0.85;
- a level of silanols per unit surface area, designated NSiOH/nm2, such that NSiOH/nm2≤−0.027 CTAB+10.5.

For example, the specific silica used in the compositions according to the invention has an average particle size, denoted by dw, ranging from 40 to 150 nm.

The silicas of very high specific surface area used as a reinforcing filler in the compositions according to the invention may have a certain microporosity; thus, the silicas used according to the invention are preferably such that (SBET−

SCTAB)≥5 m²/g, preferably ≥15 m²/g, for example ≥20 m²/g. Generally this microporosity is not too high; the silicas used according to the invention are preferably such that (SBET−SCTAB)<50 m²/g, preferably <40 m²/g.

Preferably, the level of silica having a very high specific surface area is in the range from 25 to 180 phr, preferably from 40 to 160 phr, more preferably from 50 to 140 phr. Below 25 phr of silica having a very high specific surface area, the composition might have lower performance in wear resistance, whereas above 180 phr of silica having a very high specific surface area, the composition might have lower performance in rolling resistance.

Preparation of the Silicas of Very High Specific Surface Area

Such a silica having a very high specific surface area may notably be prepared according to the protocol described in patent application WO2003/016387. This method comprises reaction of a silicate with an acidifying agent, whereby a silica suspension is obtained, and then separation and drying of this suspension. This method is characterized in that the reaction of the silicate with the acidifying agent is carried out in the following successive steps:

(α) an aqueous sediment is formed having a pH between 2 and 5, (β) silicate and acidifying agent are added to said sediment simultaneously, in such a way that the pH of the reaction mixture remains between 2 and 5, (γ) addition of the acidifying agent is stopped while continuing to add silicate to the reaction mixture until a pH of the reaction mixture between 7 and 10 is obtained, (δ) silicate and acidifying agent are added to the reaction mixture simultaneously, in such a way that the pH of the reaction mixture remains between 7 and 10, (ε) addition of the silicate is stopped while continuing to add the acidifying agent to the reaction mixture until a pH of the reaction mixture below 6 is obtained.

Selection of the acidifying agent and silicate is performed in a manner known per se. Generally the acidifying agent used is a strong mineral acid such as sulphuric acid, nitric acid or hydrochloric acid, or an organic acid such as acetic acid, formic acid or carbonic acid. The acidifying agent may be dilute or concentrated; its normality may be between 0.4 and 36 N, for example between 0.6 and 1.5 N. In particular, in the case when the acidifying agent is sulphuric acid, its concentration may be between 40 and 180 g/l, for example between 60 and 130 g/l.

Moreover, the silicate used may be any common form of silicates such as metasilicates, disilicates and advantageously an alkali metal silicate, notably sodium silicate or potassium silicate. The silicate may have a concentration (expressed in $SiO_2$) between 40 and 330 g/l, for example between 60 and 300 g/l, in particular between 60 and 260 g/l. In general, sulphuric acid is employed as the acidifying agent, and sodium silicate as the silicate. In the case when sodium silicate is used, the latter generally has a weight ratio $SiO_2/Na_2O$ between 2.5 and 4, for example between 3.2 and 3.8.

Reaction of the silicate with the acidifying agent is preferably carried out in the following steps:

First, an aqueous sediment is formed having a pH between 2 and 5. Preferably, the sediment formed has a pH between 2.5 and 5, notably between 3 and 4.5; said pH is for example between 3.5 and 4.5.

The sediment formed in step (α) may optionally comprise an electrolyte. However, preferably, no electrolyte is added during the preparation, in particular in step (α).

The term electrolyte is to be understood here in its normal acceptation, i.e. it denotes any ionic or molecular substance which, when it is in solution, decomposes or dissociates to form ions or charged particles. As electrolyte, we may mention a salt of the group of the alkali metal and alkaline-earth salts, notably the salt of the metal of the starting silicate and of the acidifying agent, for example sodium chloride in the case of the reaction of a sodium silicate with hydrochloric acid or, preferably, sodium sulphate in the case of the reaction of a sodium silicate with sulphuric acid.

The second step (step (β)) consists of simultaneous addition of acidifying agent and silicate, in a manner such that (in particular at flow rates such that) the pH of the reaction mixture remains between 2 and 5, preferably between 2.5 and 5, notably between 3 and 4.5, for example between 3.5 and 4.5. This simultaneous addition is advantageously carried out in such a way that the pH of the reaction mixture is constantly equal (to within ±0.2) to that reached at the end of the initial step (α).

Then, in a step (γ), addition of the acidifying agent is stopped while continuing to add silicate to the reaction mixture so as to obtain a pH of the reaction mixture between 7 and 10, preferably between 7.5 and 9.5. It may then be advantageous to carry out, just after this step (γ) and therefore just after stopping the addition of silicate, maturation of the reaction mixture, notably at the pH obtained at the end of step (γ), and generally with stirring; this maturation may for example take from 2 to 45 minutes, in particular from 5 to 25 minutes and preferably comprises neither addition of acidifying agent, nor addition of silicate.

After step (γ) and the optional maturation, simultaneous addition of acidifying agent and of silicate is repeated (step (δ)), in such a way that (in particular at flow rates such that) the pH of the reaction mixture remains between 7 and 10, preferably between 7.5 and 9.5. This second simultaneous addition (step (δ)) is advantageously carried out in such a way that the pH of the reaction mixture is constantly equal (to within ±0.2) to that reached at the end of the preceding step.

It should be noted that between step (γ) and step (δ), for example between, on the one hand, the optional maturation following step (γ), and on the other hand step (δ), acidifying agent may be added to the reaction mixture, the pH of the reaction mixture at the end of this addition of acidifying agent being, however, between 7 and 9.5, preferably between 7.5 and 9.5.

Finally, in a step (ε), addition of the silicate is stopped while continuing to add acidifying agent to the reaction mixture so as to obtain a pH of the reaction mixture below 6, preferably between 3 and 5.5, in particular between 3 and 5, for example between 3 and 4.5.

It may then be advantageous, after this step (ε) and therefore just after stopping addition of acidifying agent, to carry out maturation of the reaction mixture, notably at the pH obtained at the end of step (ε), and generally with stirring; this maturation may for example take from 2 to 45 minutes, in particular from 5 to 20 minutes and preferably comprises neither addition of acidifying agent, nor addition of silicate.

The reaction vessel in which the whole of the reaction of the silicate with the acidifying agent is carried out is usually provided with suitable stirring equipment and heating equipment. The whole of the reaction of the silicate with the acidifying agent is generally carried out between 70 and 95° C., in particular between 75 and 90° C. According to a variant of the invention, the whole of the reaction of the silicate with the acidifying agent is carried out at a constant temperature, usually between 70 and 95° C., in particular between 75 and 90° C. According to another variant of the invention, the temperature at the end of the reaction is higher than the temperature at the start of the reaction: thus, the temperature at the start of the reaction (for example during steps (α) to (γ)) is preferably maintained between 70 and 85° C., and then the temperature is increased, preferably up to a value between 85 and 95° C., and it is maintained at this value (for example during steps (δ) and (ε)), until the end of the reaction.

At the end of the steps that have just been described, a silica slurry is obtained, which is then separated (liquid-solid separation). The separation employed in this method of preparation usually comprises filtration, followed by washing if necessary. Filtration is carried out by any suitable method, for example using a filter press, a belt filter or a vacuum filter.

The silica suspension thus recovered (filter cake) is then dried. This drying may be carried out by any means known per se. Preferably, spray drying is employed. For this purpose, it is possible to use any suitable type of atomizer, notably an atomizer of the turbine type, nozzle type, liquid pressure type or two-fluid type. In general, when filtration is carried out using a filter press, a nozzle-type atomizer is used, and when filtration is carried out using a vacuum filter, a turbine-type atomizer is used. It should be noted that the filter cake is not always in conditions allowing spraying, notably owing to its high viscosity. In a manner known per se, the filter cake is then subjected to an operation of disintegration. This operation may be carried out mechanically, by passing the filter cake through a grinding mill of the colloidal or ball type. Disintegration is generally carried out in the presence of an aluminium compound, in particular sodium alum inate and, optionally, in the presence of an acidifying agent as described above (in the latter case, the aluminium compound and the acidifying agent are generally added simultaneously). The disintegration operation notably makes it possible to the lower viscosity of the suspension to be dried subsequently. When drying is carried out using a nozzle-type atomizer, the silica that is then obtained is usually in the form of roughly spherical beads.

After drying, we may then proceed to a step of grinding the recovered product. The silica that may then be obtained is generally in the form of powder. When drying is carried out using a turbine-type atomizer, the silica that may then be obtained may be in the form of powder.

Finally, the product that has been dried (notably by a turbine-type atomizer) or ground as indicated above may optionally be subjected to an agglomeration step, which consists for example of direct compression, wet granulation (i.e. using a binder such as water, silica suspension, etc.), extrusion or, preferably, dry compaction. When the latter technique is employed, it may prove advisable, before undertaking compaction, to deaerate (an operation also called pre-densification or degassing) the pulverulent products so as to remove the air trapped in the latter and ensure more regular compaction. The silica that may then be obtained by this agglomeration step is generally in the form of granules.

The powders, as well as the beads, of silica obtained by the method described above thus offer the advantage, among others, of obtaining granules simply, efficiently and economically, notably by conventional forming operations, for example granulation or compaction, without the latter causing any degradation that may mask, or even annihilate, the good intrinsic properties associated with these powders or beads, as may be the case in the prior art using conventional powders.

This method of preparation makes it possible to obtain precipitated silicas, which, on the one hand, are not friable, which is advantageous from the standpoint of handling and transport of the products in industrial installations, and, on the other hand, generally have satisfactory dispersibility in the polymers, endowing the latter with a very satisfactory compromise of properties, in particular at the level of their rheological and dynamic properties, and they have a good reinforcement effect.

I-2.2. Other Minor Reinforcing Filler

The composition according to the invention may comprise a reinforcing filler complementary to the silica of very high specific surface area, in a minor amount by weight.

Any type of reinforcing filler may be used that is known for its capacity for reinforcing a rubber composition usable for tyre manufacture, for example an organic filler such as carbon black, an inorganic reinforcing filler such as silica, alumina, or else a mixture of these two types of filler.

All carbon blacks are suitable as carbon blacks, notably the tyre-grade carbon blacks. Among the latter, we may mention more particularly the reinforcing carbon blacks of series 100, 200 or 300 (ASTM grades), for example the carbon blacks N115, N134, N234, N326, N330, N339, N347, N375, or else, depending on the intended applications, the blacks of higher series (for example N660, N683, N772). The carbon blacks could for example already be incorporated in an isoprene elastomer in the form of a masterbatch (see for example applications WO 97/36724 or WO 99/16600).

As examples of organic fillers other than carbon blacks, we may mention the functionalized polyvinyl organic fillers as described in applications WO-A-2006/069792, WO-A-2006/069793, WO-A-2008/003434 and WO-A-2008/003435.

The composition may contain one type of silica or a mixture of several silicas. The silica used may be any reinforcing silica known by a person skilled in the art, notably any precipitated or fumed silica. As examples of highly dispersible precipitated silicas (called "HDS"), we may mention for example the "Ultrasil 7000" and "Ultrasil 7005" silicas from the company Degussa, the "Zeosil" 1165MP, 1135MP and 1115MP silicas from the company Rhodia, the "Hi-Sil EZ150G" silica from the company PPG, the "Zeopol" 8715, 8745 and 8755 silicas from the company Huber, treated precipitated silicas such as for example the "aluminium-doped" silicas described in application EP-A-0735088 or the silicas having a high specific surface area as described in application WO 03/16837.

The silica preferably has a BET surface area between 45 and 170 m$^2$/g, more preferably between 60 and 170 m$^2$/g.

A person skilled in the art will understand that as filler equivalent to the silica described in the present paragraph, it would be possible to use a reinforcing filler of some other kind, notably organic, since this reinforcing filler would be covered with a layer of silica, or else would have functional sites, notably hydroxyls, on its surface, requiring the use of a coupling agent to establish the bond between the filler and the elastomer.

The physical state of the reinforcing filler does not matter, whether it is in the form of powder, microbeads, granules, beads or any other suitable densified form.

Preferably, the level of total reinforcing filler (including the silica having a very high specific surface area) is from 30 to 200 phr, more preferably from 45 to 170 phr and very preferably from 50 to 150 phr. Below 30 phr of filler, the composition might have lower performance in wear resistance, whereas above 200 phr of filler the composition might have lower performance in rolling resistance.

According to one embodiment, the composition comprises carbon black, as a minor filler. In this case the level of carbon black is preferably between 0 and 30 phr. In this embodiment, the level of carbon black is preferably in the range from 1 to 10 phr, preferably from 1 to 5 phr and preferably less than or equal to 4 phr.

I-2.3. Coupling Agents

The compositions according to the invention comprise a coupling agent for binding the silica to the elastomers.

These coupling agents, which are familiar to a person skilled in the art, may be for example hydrolysable silanes such as alkylalkoxysilanes, or hydroxylated or hydrolysable polyorganosiloxanes.

Notably, polysulphurized silanes are used, called "symmetric" or "asymmetric" depending on their particular structure, as described for example in applications WO03/002648 (or US 2005/016651) and WO03/002649 (or US 2005/016650).

In particular, without the following definition being limiting, so-called "symmetric" polysulphurized silanes are suitable that correspond to the following general formula (III):

Z-A-Sx-A-Z, in which: (III)

x is an integer from 2 to 8 (preferably from 2 to 5);
A is a divalent hydrocarbon radical (preferably C1-C18 alkylene groups or C6-C12 arylene groups, more particularly C1-C10, notably C1-C4 alkylenes, in particular propylene);
Z corresponds to one of the following formulae:

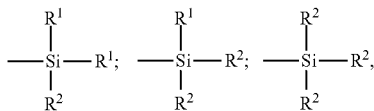

in which:
the radicals R1 which may, substituted or unsubstituted, and identical or different, represent a C1-C18 alkyl, C5-C18 cycloalkyl or C6-C18 aryl group (preferably C1-C6 alkyl groups, cyclohexyl or phenyl groups, notably C1-C4 alkyl groups, more particularly methyl and/or ethyl).
the radicals R2, which may substituted or unsubstituted, and identical or different, represent a C1-C18 alkoxy or C5-C18 cycloalkoxyl group (preferably a group selected from C1-C8 alkoxyls and C5-C8 cycloalkoxyls, even more preferably a group selected from C1-C4 alkoxyls, in particular methoxy and ethoxy).

In the case of a mixture of polysulphurized alkoxysilanes corresponding to formula (III) above, notably the usual commercially available mixtures, the average value of the "x's" is a fractional number preferably between 2 and 5, more preferably close to 4. However, the invention may also be carried out advantageously for example with disulphurized alkoxysilanes (x=2).

As examples of polysulphurized silanes, we may mention more particularly the polysulphides (notably disulphides, trisulphides or tetrasulphides) of bis(alkoxy(C1-C4)-alkyl (C1-C4)silyl-alkyl(C1-C4)), for example the polysulphides of bis(3-trimethoxysilylpropyl) or of bis(3-triethoxysilylpropyl). Among these compounds, in particular the tetrasulphide of bis(3-triethoxysilylpropyl), abbreviated to TESPT, of formula [(C2H5O)3Si(CH2)3S2]2 or the disulphide of bis(triethoxysilylpropyl), abbreviated to TESPD, of formula [(C2H5O)3Si(CH2)3S]2, is used. We may also mention as preferred examples the polysulphides (notably disulphides, trisulphides or tetrasulphides) of bis(monoalkoxyl(C1-C4)-dialkyl(C1-C4)silylpropyl), more particularly the tetrasulphide of bis-monoethoxydimethylsilylpropyl as described in patent application WO 02/083782 (or US 2004/132880).

As coupling agent other than polysulphurized alkoxysilane, we may also mention the bifunctional POSs (polyorganosiloxanes) or else the polysulphides of hydroxysilane (R2=OH in the above formula III) as described in patent applications WO 02/30939 (or U.S. Pat. No. 6,774,255) and WO 02/31041 (or US 2004/051210), or else silanes or POSs bearing azo-dicarbonyl functional groups, as described for example in patent applications WO 2006/125532, WO 2006/125533, WO 2006/125534.

In the rubber compositions according to the invention, the content of coupling agent is preferably between 2 and 20 phr, more preferably between 3 and 15 and even more preferably between 4 and 12 phr.

I-3 Vulcanizing System

The vulcanizing system itself is based on sulphur (or a sulphur-donating agent) and a primary vulcanization accelerator. Various known secondary accelerators or vulcanization activators such as zinc oxide, stearic acid or equivalent compounds, guanidine derivatives (in particular diphenylguanidine) will be added to this basic vulcanizing system and incorporated during the first non-productive phase and/or during the productive phase as described later.

Sulphur is used at a preferred level between 0.5 and 10 phr, more preferably between 0.5 and 5 phr, in particular between 0.5 and 3 phr when the composition of the invention is intended, according to a preferred embodiment of the invention, to constitute a tyre tread.

The vulcanizing system of the composition according to the invention may also comprise one or more additional accelerators, for example the compounds of the thiuram class, the zinc dithiocarbamate derivatives, the sulphenamides, the guanidines or the thiophosphates. In particular, any compound may be used that is able to act as an accelerator of the vulcanization of the diene elastomers in the presence of sulphur, notably accelerators of the thiazole type as well as their derivatives, accelerators of the thiuram type, zinc dithiocarbamates. These accelerators are more preferably selected from the group consisting of 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert-butyl-2-benzothiazyl sulphenamide (abbreviated to "TBBS"), N-tert-butyl-2-benzothiazyl sulphenimide (abbreviated to "TBSI"), zinc dibenzyldithiocarbamate (abbreviated to "ZBEC") and mixtures of these compounds. A primary accelerator of the sulphenamide type is preferably used.

I-4 Combination of Plasticizers

The composition according to the invention further comprises a combination of plasticizers or a plasticizing system. This plasticizer combination consists of at least a low-Tg hydrocarbon resin. In addition to this first plasticizer, the composition may optionally comprise a plasticizing oil and/or a high-Tg hydrocarbon resin.

Preferably, the total level of plasticizer in the composition is greater than or equal to 25 phr, more preferably greater than or equal to 30 phr, preferably from 45 to 120 phr, in particular from 50 to 100 phr, for example from 50 to 90 phr. With less than 30 phr, and especially with less than 25 phr of plasticizer, the composition might have lower performance with respect to industrial processability.

I-4-1 Low-Tg Resin

The plasticizer combination in the composition of the invention comprises at least one hydrocarbon resin that is viscous at 20° C., called "low-Tg", i.e. which by definition has a Tg in the range from −40° C. to 20° C.

Preferably, the low-Tg plasticizing hydrocarbon resin has at least any one of the following characteristics:
- a Tg between −40° C. and 0° C., more preferably between −30° C. and 0° C. and even more preferably between −20° C. and 0° C.;
- a number-average molecular weight (Mn) below 800 g/mol, preferably below 600 g/mol and more preferably below 400 g/mol;
- a softening point in the range from 0 to 50° C., preferably from 0 to 40° C., more preferably from 10 to 40° C., preferably from 10 to 30° C.;
- a polydispersity index (PDI) below 3, more preferably below 2 (reminder: PDI=Mw/Mn where Mw is the weight-average molecular weight).

More preferably, this low-Tg plasticizing hydrocarbon resin has all of the above preferred characteristics.

The softening point is measured according to standard ISO 4625 ("Ring and Ball" method). Tg is measured according to standard ASTM D3418 (1999). The macrostructure (Mw, Mn and PDI) of the hydrocarbon resin is determined by size exclusion chromatography (SEC): solvent tetrahydrofuran; temperature 35° C.; concentration 1 g/l; flow rate 1 ml/min; solution filtered on a filter of porosity 0.45 µm before injection; Moore calibration with polystyrene standards; set of 3 "WATERS" columns in series ("STYRAGEL" HR4E, HR1 and HR0.5); detection by differential refractometer ("WATERS 2410") and its associated operating software ("WATERS EMPOWER").

The thermoplastic hydrocarbon resins may be aliphatic, or aromatic, or of the aliphatic/aromatic type, i.e. based on aliphatic and/or aromatic monomers. They may be natural or synthetic, petroleum-based or not petroleum-based (if petroleum-based, they are also known as petroleum resins).

The following, for example, are suitable as aromatic monomers: styrene, alpha-methylstyrene, ortho-, meta-, para-methylstyrene, vinyl-toluene, para-tert-butylstyrene, the methoxystyrenes, the chlorostyrenes, vinylmesitylene, divinylbenzene, vinylnaphthalene, any vinyl aromatic monomer obtained from a C9 cut (or more generally from a C8 to C10 cut). Preferably, the vinyl aromatic monomer is styrene or a vinyl aromatic monomer from a C9 cut (or more generally from a C8 to C10 cut). Preferably, the vinyl aromatic monomer is the minor monomer, expressed in mole fraction, in the copolymer in question.

According to an especially preferred embodiment, the plasticizing hydrocarbon resin is selected from the group consisting of the homopolymer or copolymer resins of cyclopentadiene (abbreviated to CPD) or dicyclopentadiene (abbreviated to DCPD), the homopolymer or copolymer terpene resins, the homopolymer or copolymer terpene phenol resins, the homopolymer or copolymer resins from the C5 cut, the homopolymer or copolymer resins from the C9 cut, and mixtures of these resins, usable alone or in combination with a liquid plasticizer, for example an MES or TDAE oil. Here, the term "terpene" encompasses, in a known manner, the alpha-pinene, beta-pinene and limonene monomers; a limonene monomer is preferably used, a compound that in a known manner occurs in the form of three possible isomers: L-limonene (laevorotatory enantiomer), D-limonene (dextrorotatory enantiomer), or else dipentene, racemate of the dextrorotatory and laevorotatory enantiomers. Among the above plasticizing hydrocarbon resins, we may notably mention the homopolymer or copolymer resins of alpha-pinene, beta-pinene, dipentene or polylimonene.

The aforementioned preferred resins are familiar to a person skilled in the art and are commercially available, for example they are sold, in the case of the:
- aliphatic resins: by the company CRAY VALLEY under the name "Wingtack 10" (Mn=480 g/mol; Mw=595 g/mol; PDI=1.2; SP=10° C.; Tg=−28° C.),
- coumarone indene resins: by the company Rütgers Chemicals under the name "Novares C30" (Mn=295 g/mol; Mw=378 g/mol; PDI=1.28; SP=25° C.; Tg=−19° C.);
- resins of aliphatic and aromatic C9 cut: by the company Rütgers Chemicals under the name "Novares TT30" (Mn=329 g/mol; Mw=434 g/mol; PDI=1.32; SP=25° C.; Tg=−12° C.).

The level of low-Tg plasticizing hydrocarbon resin is greater than or equal to 15 phr, preferably in the range from 15 phr to 120 phr, preferably from 20 to 110 phr, even more preferably between 25 and 90 phr. In fact, below 15 phr of low-Tg resin, the composition might have problems with stickiness affecting industrial processability.

I-4-2 Plasticizing Oil

Optionally, the plasticizer combination in the composition of the invention comprises an extender oil (or plasticizing resin) that is liquid at 20° C., called "low-Tg", i.e. which by definition has a Tg below −20° C., preferably below −40° C.

Any extender oil, whether of aromatic or non-aromatic nature and known to have plasticizing properties with respect to diene elastomers, can be used. At room temperature (20° C.), these oils, of variable viscosity, are liquid (i.e. as a reminder, substances having capacity to take on the shape of their container eventually), in contrast notably to plasticizing hydrocarbon resins, which are by their nature solid at room temperature.

The extender oils are particularly suitable that are selected from the group consisting of the naphthenic oils (of low or high viscosity, notably hydrogenated or not hydrogenated), paraffinic oils, MES oils (Medium Extracted Solvates), TDAE oils (Treated Distillate Aromatic Extracts), mineral oils, vegetable oils, ether plasticizers, ester plasticizers, phosphate plasticizers, sulphonate plasticizers and mixtures of these compounds. For example, we may mention those that contain between 12 and 30 carbon atoms, for example trioctyl phosphate. As examples of non-aqueous and non-water-soluble ester plasticizers, we may mention notably the compounds selected from the group consisting of the trimellitates, pyromellitates, phthalates, 1,2-cyclohexane dicarboxylates, adipates, azelaates, sebacates, triesters of glycerol and mixtures of these compounds. Among the above triesters, we may notably mention the glycerol triesters, preferably consisting predominantly (to more than 50 wt %, more preferably to more than 80 wt %) of an unsaturated C18 fatty acid, i.e. selected from the group consisting of oleic acid, linoleic acid, linolenic acid and mixtures of these acids. More preferably, whether it is of synthetic or natural origin (for example in the case of sunflower or colza vegetable oils), the fatty acid used consists of oleic acid to more than 50 wt %, even more preferably to more than 80 wt %. Said triesters (trioleates) with a high level of oleic acid are well known, and were described for example in application WO 02/088238, as plasticizers in tyre treads.

Preferably, the level of extender oil is between 2 and 50 phr, more preferably between 5 and 30 phr, even more preferably between 10 and 30 phr. Below 2 phr of oil or above 50 phr of oil, the composition might have lower performance in terms of grip, because the Tg of the mixture is too high or too low.

I-4-3 High-Tg Resin

Optionally, the plasticizer combination may also contain a thermoplastic hydrocarbon resin whose Tg is above 20° C. This resin is a solid at room temperature (23° C.), as opposed to a liquid plasticizer compound such as an oil or one that is viscous such as a low-Tg resin.

Preferably, the plasticizing thermoplastic hydrocarbon resin has at least any one of the following characteristics:
- a Tg above 30° C.;
- a number-average molecular weight (Mn) between 400 and 2000 g/mol, more preferably between 500 and 1500 g/mol;
- a polydispersity index (PDI) below 3, more preferably below 2 (reminder: PDI=Mw/Mn where Mw is the weight-average molecular weight).

More preferably, this plasticizing thermoplastic hydrocarbon resin has all of the above preferred characteristics.

The macrostructure (Mw, Mn and PDI) of the hydrocarbon resin is determined by size exclusion chromatography (SEC): solvent tetrahydrofuran; temperature 35° C.; concentration 1 g/l; flow rate 1 ml/min; solution filtered on a filter of porosity 0.45 µm before injection; Moore calibration with polystyrene standards; set of 3 "WATERS" columns in series ("STYRAGEL" HR4E, HR1 and HR0.5); detection by differential refractometer ("WATERS 2410") and its associated operating software ("WATERS EMPOWER").

The thermoplastic hydrocarbon resins may be aliphatic, or aromatic, or of the aliphatic/aromatic type, i.e. based on aliphatic and/or aromatic monomers. They may be natural or synthetic, petroleum-based or not petroleum-based (if petroleum-based, they are also known as petroleum resins).

Suitable aromatic monomers are for example styrene, alpha-methylstyrene, ortho-, meta-, para-methylstyrene, vinyl-toluene, para-tert-butylstyrene, the methoxystyrenes, the chlorostyrenes, vinylmesitylene, divinylbenzene, vinylnaphthalene, any vinyl aromatic monomer from a C9 cut (or more generally from a C8 to C10 cut). Preferably, the vinyl aromatic monomer is styrene or a vinyl aromatic monomer from a C9 cut (or more generally from a C8 to C10 cut). Preferably, the vinyl aromatic monomer is the minor monomer, expressed in mole fraction, in the copolymer in question.

According to an especially preferred embodiment, the plasticizing hydrocarbon resin is selected from the group consisting of the homopolymer or copolymer resins of cyclopentadiene (abbreviated to CPD) or dicyclopentadiene (abbreviated to DCPD), the homopolymer or copolymer terpene resins, the homopolymer or copolymer terpene phenol resins, the homopolymer or copolymer resins from a C5 cut, the homopolymer or copolymer resins from a C9 cut, the homopolymer and copolymer resins of alpha-methylstyrene and mixtures of these resins, usable alone or in combination with a liquid plasticizer, for example an MES or TDAE oil. Here, the term "terpene" encompasses in a known manner the alpha-pinene, beta-pinene and limonene monomers; a limonene monomer is preferably used, a compound that in a known manner occurs in the form of three possible isomers: L-limonene (laevorotatory enantiomer), D-limonene (dextrorotatory enantiomer), or else dipentene, racemate of the dextrorotatory and laevorotatory enantiomers. Among the above plasticizing hydrocarbon resins, we may notably mention the homopolymer or copolymer resins of alpha-pinene, beta-pinene, dipentene or polylimonene.

The aforementioned preferred resins are familiar to a person skilled in the art and are commercially available, for example they are sold, in the case of the:
- polylimonene resins: by the company DRT under the name "Dercolyte L120" (Mn=625 g/mol; Mw=1010 g/mol; PDI=1.6; Tg=72° C.) or by the company ARIZONA under the name "Sylvagum TR7125C" (Mn=630 g/mol; Mw=950 g/mol; PDI=1.5; Tg=70° C.);
- resins of C5 cut/vinyl aromatic copolymer, notably C5 cut/styrene or C5 cut/C9 cut: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", by Exxon under the names "Escorez 2101" and "Escorez 1273";
- resins of limonene/styrene copolymer: by DRT under the name "Dercolyte TS 105" from the company DRT, by ARIZONA Chemical Company under the names "ZT115LT" and "ZT5100".

As examples of other preferred resins, we may also mention the phenol-modified alpha-methylstyrene resins. For characterizing these phenol-modified resins, as a reminder, an index called the "hydroxyl index" is used in a known manner (measured according to standard ISO 4326 and expressed in mg KOH/g). The alpha-methylstyrene resins, notably those modified with phenol, are familiar to a person skilled in the art and are commercially available, and for example are sold by the company Arizona Chemical under the names "Sylvares SA 100" (Mn=660 g/mol; PDI=1.5; Tg=53° C.); "Sylvares SA 120" (Mn=1030 g/mol; PDI=1.9; Tg=64° C.); "Sylvares 540" (Mn=620 g/mol; PDI=1.3; Tg=36° C.; hydroxyl index=56 mg KOH/g); "Silvares 600" (Mn=850 g/mol; PDI=1.4; Tg=50° C.; hydroxyl index=31 mg KOH/g).

According to a particular embodiment of the invention, when it is included in the composition, the level of plasticizing hydrocarbon resin is in the range from 5 to 80 phr, preferably ranging from 7 to 70 phr, even more preferably from 10 to 65 phr. Also preferably, the level of plasticizing resin is in the range from 5 to 20 phr, and more preferably from 5 to 15 phr.

I-5 Ratio of the Levels of Filler and of Plasticizer

According to the invention, the levels of reinforcing filler and of plasticizer are preferably such that the ratio of the total level of filler to the total level of plasticizer is in the range from 1.3 to 2. Below 1.3 the composition might have lower hardness, leading to lower performance in vehicle handling, whereas above 2 the composition might have a high Mooney value, resulting in lower industrial processability.

Preferably, the ratio of the total level of filler to the total level of plasticizer is in the range from 1.3 to 1.8 and preferably from 1.4 to 1.7.

I-6 Other Possible Additives

The rubber compositions according to the invention optionally also comprise some or all of the usual additives usually employed in the compositions of elastomers intended notably for the manufacture of tyre treads, for example pigments, protective agents such as anti-ozone waxes, chemical anti-ozonizing agents, antioxidants, plasticizers other than those described above, antifatigue agents, reinforcing resins, methylene acceptors (for example novolac phenolic resin) or methylene donors (for example HMT or H3M).

Of course, the compositions according to the invention may be used alone or mixed (i.e. in a mixture) with any other rubber composition usable for tyre manufacture.

It goes without saying that the invention relates to the rubber compositions described above both in the so-called "raw" or noncrosslinked state (i.e. before curing) and in the so-called "cured" or crosslinked state, or else vulcanized (i.e. after crosslinking or vulcanization).

II—Preparation of the Rubber Compositions

The compositions are manufactured in suitable mixers, using two successive phases of preparation that are familiar to a person skilled in the art: a first phase of thermomechanical working or kneading (sometimes described as the "non-productive" phase) at high temperature, up to a maximum temperature between 110° C. and 190° C., preferably between 130° C. and 180° C., followed by a second phase of mechanical work (sometimes described as the "productive" phase) at lower temperature, typically below 110° C., for example between 60° C. and 100° C., which is the finishing phase, during which the crosslinking or vulcanizing system is incorporated; these phases are described for example in applications EP-A-0501227, EP-A-0735088, EP-A-0810258, WO00/05300 or WO00/05301.

The first (non-productive) phase is preferably carried out in several thermomechanical steps. In a first step, a suitable mixer, such as a usual internal mixer, is charged with the elastomers, the reinforcing fillers, the combination of plasticizers (and optionally the coupling agents and/or other ingredients apart from the vulcanizing system), at a temperature between 20° C. and 100° C., and preferably between 25° C. and 100° C. After some minutes, preferably from 0.5 to 2 min and a temperature rise from 90° C. to 100° C., the other ingredients (i.e. those that remain if they were not all introduced initially) are added in one go or in portions, apart from the vulcanizing system, during mixing ranging from 20 seconds to several minutes. The total kneading time, in this non-productive phase, is preferably between 2 and 10 minutes at a temperature less than or equal to 180° C., and preferably less than or equal to 170° C.

After the mixture thus obtained has cooled, the vulcanizing system is then incorporated at low temperature (typically below 100° C.), generally in an external mixer such as an open mill; the whole is then mixed (productive phase) for several minutes, for example between 5 and 15 min.

The final composition thus obtained is then calendered, for example in the form of a sheet or a plate, notably for characterization in the laboratory, or else is extruded, to form for example a rubber profile used for manufacture of semi-finished products in order to obtain products such as a tyre tread. These products may then be used for tyre manufacture, by the techniques known by a person skilled in the art.

Vulcanization (or curing) is carried out in a known manner at a temperature generally between 130° C. and 200° C., under pressure, for a sufficient time, which may vary for example between 5 and 90 min notably as a function of the curing temperature, the vulcanizing system adopted, the vulcanization kinetics of the composition in question or else the size of the tyre.

The examples given hereunder illustrate the invention but without limiting it.

III—Embodiment Examples of the Invention

III-1 Preparation of the Examples

In the following examples, the rubber compositions were prepared as described above.

III-2 Characterization of the Examples

In the examples, the rubber compositions are characterized before and/or after curing as indicated below.

Tensile Testing (After Curing):

These tests make it possible to determine the elastic strains and the rupture properties. Unless stated otherwise, they are based on standard NF ISO 37 of December 2005. As second elongation (i.e. after a cycle of accommodation), the so-called "nominal" secant moduli (or apparent stresses, in MPa, relative to the strain, without units) are measured at 10% elongation ("MA10"). All these tensile measurements are carried out in normal conditions of hygrometry (50±10% relative humidity), at 100° C. For greater clarity the results will be stated for a base of 100, the value 100 being assigned to the control. A result below 100 thus indicates a decrease of the value in question, and conversely, a result above 100 will indicate an increase of the value in question.

The value of MA10 measured at 100° C. is a good indicator of the drive stability of the vehicle (vehicle handling): the higher the value, the better the performance. For greater clarity, the results will be stated based on performance, with a base of 100, the value 100 being assigned to the control. A result below 100 thus indicates a decrease of performance in drive stability (decrease of the value of MA10 at 100° C.), and conversely, a result above 100 will indicate an increase in performance (increase of the value of MA10 at 100° C.).

Dynamic Properties (After Curing):

The dynamic properties G* and tan(δ)max are measured on a viscoanalyser (Metravib V A4000), according to standard ASTM D 5992-96. The response of a sample of vulcanized composition (cylindrical test specimen with thickness of 4 mm and cross-section of 400 mm$^2$), subjected to sinusoidal stressing in alternating simple shear, at a frequency of 10 Hz, in variable temperature conditions, notably at 23° C. and 100° C. according to standard ASTM D 1349-99. An amplitude scan is performed with peak-to-peak strain from 0.1 to 50% (forward cycle), and then from 50% to 1% (return cycle). The results used are the complex dynamic shear modulus (G*) and the loss factor (tan δ). For the return cycle, the maximum value of tan δ observed (tan(δ)max) is stated, as well as the difference in complex modulus (ΔG*) between the values at 0.1% and at 50% strain (Payne effect).

For the value of tan(δ)max at 100° C., the higher the value, the more the composition will provide good dry road grip. For greater clarity, the results will be stated according to the performance, with a base of 100, the value 100 being assigned to the control. A result below 100 thus indicates a decrease of dry road grip performance (decrease of the value of tan(δ)max at 100° C.), and conversely, a result above 100 will indicate an increase in performance (increase of the value of tan(δ)max at 100° C.).

For the value of tan(δ)max at 23° C., the lower the value, the more the composition will have low hysteresis and therefore low rolling resistance. For greater clarity, the results will be stated according to the performance, with a base of 100, the value 100 being assigned to the control. A result below 100 thus indicates a decrease of rolling resistance performance (increase of the value of tan(δ) max at 23° C.), and conversely, a result above 100 will indicate an increase in performance (decrease of the value of tan(δ)max at 23° C.).

III-3 Examples

The compositions are manufactured by introducing all of the constituents into an internal mixer, apart from the vulcanizing system. The vulcanizing agents (sulphur and accelerator) are fed into an external mixer at low temperature (the rolls of the mixer being at about 30° C.).

The examples presented in Tables 1 to 4 aim to compare the various properties in rubber manufacture of control compositions (T1 to T12) with compositions C1 to C4 according to the invention.

Relative to the control compositions, it is noted that the compositions according to the invention offer the best compromise of performance between the modulus, and the measurements of Tan(δ)max at 23° C. and 100° C. These results show that the compositions of the invention give good performance for the essential aspects, namely vehicle handling, dry road grip, and rolling resistance. None of the control compositions give such a good compromise of all these performance characteristics simultaneously.

TABLE 1

|  | T1 | T2 | T3 | C1 |
| --- | --- | --- | --- | --- |
| SBR (1) | 80 | 80 | 80 | 80 |
| BR (2) | 20 | 20 | 20 | 20 |
| Carbon black (3) | 4 | 4 | 4 | 4 |
| Silica with CTAB of about 160 m²/g (4) | 90 | 90 | 0 | 0 |
| Silica with CTAB of about 200 m²/g (5) | 0 | 0 | 90 | 90 |
| High-Tg plasticizing resin (6) | 45 | 13 | 45 | 13 |
| Low-Tg plasticizing resin (7) | 0 | 32 | 0 | 32 |
| Plasticizing vegetable oil (8) | 10 | 10 | 10 | 10 |
| Coupling agent (9) | 7.2 | 7.2 | 7.2 | 7.2 |
| Wax | 2 | 2 | 2 | 2 |
| Antioxidant (10) | 2 | 2 | 2 | 2 |
| Stearic acid | 3 | 3 | 3 | 3 |
| Accelerator (11) | 4 | 4 | 4 | 4 |
| Activator (12) | 2 | 2 | 2 | 2 |
| Sulphur | 1 | 1 | 1 | 1 |
| ZnO | 1.2 | 1.2 | 1.2 | 1.2 |
| MA10 at 100° C. (Performance - base 100) | 100 | 101 | 109 | 111 |
| tan(δ) max 100° C. (Performance - base 100) | 100 | 90 | 104 | 103 |
| tan(δ) max 23° C. (Performance - base 100) | 100 | 113 | 99 | 110 |
| Average of tan(δ) max 23° C. and 100° C. | 100 | 102 | 102 | 107 |

In Tables 1 to 4, the components of the compositions referenced 1 to 12 represent the following components.
(1) SBR with 26% of styrene unit and 24% of 1,2 unit of the butadiene moiety (Tg=−48° C.);
(2) BR: polybutadiene with 0.5% of 1-2 unit; 1.2% of trans 1-4 unit; 98.3% of cis 1-4 unit (Tg=−108° C.);
(3) ASTM N234 grade (Cabot company);
(4) "Zeosil 1165 MP" silica from the company Solvay, "HDS" type;
(5) "Zeosil Premium 200 MP" silica from the company Solvay;
(6) High-Tg hydrocarbon resin, of C5/C9 cut "Wingtack STS" from the company Cray Valley;
(7) Low-Tg hydrocarbon resin "Novares C30" from the company Rütgers Chemical;
(8) Glycerol trioleate, sunflower oil with 85 wt % oleic acid "Lubrirob Tod 1880" from the company Novance;
(9) Coupling agent: "Si69" from the company Evonik-Degussa;
(10) N-(1,3-dimethylbutyl)-N'-phenyl-p-phenylenediamine (Santoflex 6-PPD) from the company Flexsys and Antiozone wax;
(11) N-cyclohexyl-2-benzothiazole-sulphenamide ("Santocure CBS" from the company Flexsys);
(12) Diphenylguanidine "Perkacit DPG" from the company Flexsys.

TABLE 2

|  | T4 | T5 | T6 | C2 |
| --- | --- | --- | --- | --- |
| SBR (1) | 100 | 100 | 100 | 100 |
| Carbon black (3) | 4 | 4 | 4 | 4 |
| Silica with BET of about 160 m²/g (4) | 50 | 50 | 0 | 0 |
| Silica with BET of about 200 m²/g (5) | 0 | 0 | 50 | 50 |
| High-Tg plasticizing resin (6) | 30 | 0 | 30 | 0 |
| Low-Tg plasticizing resin (7) | 0 | 30 | 0 | 30 |
| Coupling agent (9) | 4 | 4 | 4 | 4 |
| Wax | 2 | 2 | 2 | 2 |
| Antioxidant (10) | 2 | 2 | 2 | 2 |
| Stearic acid | 3 | 3 | 3 | 3 |
| Accelerator (11) | 4 | 4 | 4 | 4 |
| Activator (12) | 2 | 2 | 2 | 2 |
| Sulphur | 1 | 1 | 1 | 1 |
| ZnO | 1.2 | 1.2 | 1.2 | 1.2 |
| MA10 at 100° C. (Performance - base 100) | 100 | 108 | 111 | 113 |
| tan(δ) max 100° C. (Performance - base 100) | 100 | 91 | 110 | 98 |
| tan(δ) max 23° C. (Performance - base 100) | 100 | 125 | 104 | 125 |
| Average of tan(δ) max 23° C. and 100° C. | 100 | 108 | 107 | 112 |

TABLE 3

|  | T7 | T8 | T9 | C3 |
| --- | --- | --- | --- | --- |
| SBR (1) | 100 | 100 | 100 | 100 |
| Carbon black (3) | 4 | 4 | 4 | 4 |
| Silica with BET of about 160 m²/g (4) | 140 | 140 | 0 | 0 |
| Silica with BET of about 200 m²/g (5) | 0 | 0 | 140 | 140 |
| High-Tg plasticizing resin (6) | 65 | 10 | 65 | 10 |
| Low-Tg plasticizing resin (7) | 0 | 80 | 0 | 80 |
| Plasticizing vegetable oil (8) | 25 | 0 | 25 | 0 |
| Coupling agent (9) | 11.2 | 11.2 | 11.2 | 11.2 |
| Wax | 2 | 2 | 2 | 2 |
| Antioxidant (10) | 2 | 2 | 2 | 2 |
| Stearic acid | 3 | 3 | 3 | 3 |
| Accelerator (11) | 4 | 4 | 4 | 4 |
| Activator (12) | 2 | 2 | 2 | 2 |
| Sulphur | 1 | 1 | 1 | 1 |
| ZnO | 1.2 | 1.2 | 1.2 | 1.2 |
| MA10 at 100° C. (Performance - base 100) | 100 | 133 | 123 | 170 |
| tan(δ) max 100° C. (Performance - base 100) | 100 | 81 | 100 | 96 |
| tan(δ) max 23° C. (Performance - base 100) | 100 | 109 | 107 | 120 |
| Average of tan(δ) max 23° C. and 100° C. | 100 | 95 | 104 | 108 |

TABLE 4

|  | T10 | T11 | T12 | C4 |
| --- | --- | --- | --- | --- |
| SBR (1) | 100 | 100 | 100 | 100 |
| Carbon black (3) | 4 | 4 | 4 | 4 |
| Silica with BET of about 160 m²/g (4) | 90 | 90 | 0 | 0 |
| Silica with BET of about 200 m²/g (5) | 0 | 0 | 90 | 90 |
| High-Tg plasticizing resin (6) | 45 | 13 | 45 | 13 |
| Low-Tg plasticizing resin (7) | 0 | 32 | 0 | 32 |
| Plasticizing vegetable oil (8) | 10 | 10 | 10 | 10 |
| Coupling agent (9) | 7.2 | 7.2 | 7.2 | 7.2 |
| Wax | 2 | 2 | 2 | 2 |
| Antioxidant (10) | 2 | 2 | 2 | 2 |
| Stearic acid | 3 | 3 | 3 | 3 |
| Accelerator (11) | 4 | 4 | 4 | 4 |
| Activator (12) | 2 | 2 | 2 | 2 |
| Sulphur | 1 | 1 | 1 | 1 |
| ZnO | 1.2 | 1.2 | 1.2 | 1.2 |
| MA10 at 100° C. (Performance - base 100) | 100 | 112 | 113 | 116 |
| tan(δ) max 100° C. (Performance - base 100) | 100 | 98 | 114 | 109 |

TABLE 4-continued

|  | T10 | T11 | T12 | C4 |
|---|---|---|---|---|
| tan(δ) max 23° C. (Performance - base 100) | 100 | 110 | 97 | 111 |
| Average of tan(δ) max 23° C. and 100° C. | 100 | 104 | 106 | 110 |

The invention claimed is:

1. A rubber composition based on at least:
one diene elastomer;
a reinforcing filler;
a vulcanizing system; and
a plasticizing system,
wherein said reinforcing filler predominantly comprises, by weight, a silica with a CTAB specific surface area greater than or equal to 170 m²/g, and
wherein said plasticizing system comprises 25 phr to 90 phr of a hydrocarbon resin having a glass transition temperature Tg between −20° C. and 0° C. and 5 phr to 80 phr of a hydrocarbon resin having a glass transition temperature Tg greater than 20° C., phr being parts by weight per hundred parts by weight of elastomer.

2. The rubber composition according to claim 1, wherein said diene elastomer is selected from the group consisting of polybutadienes, synthetic polyisoprenes, natural rubber, butadiene copolymers, isoprene copolymers and mixtures thereof.

3. The rubber composition according to claim 1, wherein said diene elastomer is selected from the group consisting of polybutadienes, copolymers of butadiene and styrene, and mixtures thereof.

4. The rubber composition according to claim 1, wherein a content of reinforcing filler is in the range from 30 to 200 phr.

5. The rubber composition according to claim 4, wherein the content of reinforcing filler is in the range from 45 to 170 phr.

6. The rubber composition according to claim 5, wherein the content of reinforcing filler is in the range from 50 to 150 phr.

7. The rubber composition according to claim 1, wherein a content of the silica is in the range from 25 to 180 phr.

8. The rubber composition according to claim 7, wherein the content of the silica is in the range from 40 to 160 phr.

9. The rubber composition according to claim 8, wherein the content of the silica is in the range from 50 to 140 phr.

10. The rubber composition according to claim 1, wherein the CTAB specific surface area of the silica is in the range from 170 to 250 m²/g.

11. The rubber composition according to claim 10, wherein the CTAB specific surface area of the silica is in the range from 180 to 240 m²/g.

12. The rubber composition according to claim 1, wherein the silica has a BET specific surface area in the range from 170 to 320 m²/g.

13. The rubber composition according to claim 12, wherein the silica has a BET specific surface area in the range from 200 to 300 m²/g.

14. The rubber composition according to claim 1, wherein the silica has an average particle size dw, by weight, in the range from 20 to 300 nm.

15. The rubber composition according to claim 14, wherein the silica has an average particle size dw in the range from 40 to 150 nm.

16. The rubber composition according to claim 1, wherein the silica has a distribution of particle size dw such that dw≥(16 500/CTAB)−30.

17. The rubber composition according to claim 1, wherein the silica has a porosity that meets the criterion half-height width of the pore size distribution L/fineness index FI≥−0.0025 CTAB+0.85.

18. The rubber composition according to claim 1, wherein carbon black is a minor reinforcing filler.

19. The rubber composition according to claim 18, wherein a content of carbon black is between 0 and 30 phr.

20. The rubber composition according to claim 19, wherein the content of carbon black is in the range from 1 to 10 phr.

21. The rubber composition according to claim 20, wherein the content of carbon black is in the range from 1 to 5 phr.

22. The rubber composition according to claim 1, wherein the hydrocarbon resin has a number-average molecular weight below 800 g/mol.

23. The rubber composition according to claim 22, wherein the hydrocarbon resin has a number-average molecular weight below 600 g/mol.

24. The rubber composition according to claim 23, wherein the hydrocarbon resin has a number-average molecular weight below 400 g/mol.

25. The rubber composition according to claim 1, wherein the hydrocarbon resin has a softening point in the range from 0 to 50° C.

26. The rubber composition according to claim 25, wherein the hydrocarbon resin has a softening point in the range from 0 to 40° C.

27. The rubber composition according to claim 26, wherein the hydrocarbon resin has a softening point in the range from 10 to 40° C.

28. The rubber composition according to claim 27, wherein the hydrocarbon resin has a softening point in the range from 10 to 30° C.

29. The rubber composition according to claim 1, wherein the hydrocarbon resin has a polydispersity index PDI below 3.

30. The rubber composition according to claim 29, wherein the hydrocarbon resin has a polydispersity index PDI below 2.

31. The rubber composition according to claim 1, wherein the plasticizing system further comprises a plasticizing oil.

32. The rubber composition according to claim 31, wherein the plasticizing oil is selected from the group consisting of naphthenic oils, paraffinic oils, medium extracted solvates oils, treated distillate aromatic extracts oils, mineral oils, vegetable oils, ether plasticizers, ester plasticizers, phosphate plasticizers, sulphonate plasticizers and mixtures thereof.

33. The rubber composition according to claim 31, wherein a content of the plasticizing oil is in the range from 2 to 50 phr.

34. The rubber composition according to claim 33, wherein the content of the plasticizing oil is in the range from 5 to 30 phr.

35. The rubber composition according to claim 1, wherein the content of the hydrocarbon resin with the Tg above 20° C. is in the range from 7 to 70 phr.

36. The rubber composition according to claim 35, wherein the content of the hydrocarbon resin with Tg above 20° C. is in the range from 10 to 65 phr.

37. The rubber composition according to claim 1, wherein the hydrocarbon resin with Tg above 20° C. has a Tg above 30° C.

38. The rubber composition according to claim 1, wherein the hydrocarbon resin with Tg above 20° C. has a number-average molecular weight between 400 and 2000 g/mol.

39. The rubber composition according to claim 38, wherein the hydrocarbon resin with Tg above 20° C. has a number-average molecular weight between 500 and 1500 g/mol.

40. The rubber composition according to claim 1, wherein the hydrocarbon resin with Tg above 20° C. has a polydispersity index PDI below 3.

41. The rubber composition according to claim 40, wherein the hydrocarbon resin with Tg above 20° C. has a polydispersity index PDI below 2.

42. The rubber composition according to claim 1, wherein a total content of plasticizing system is greater than or equal to 25 phr.

43. The rubber composition according to claim 42, wherein the total content of plasticizing system is in the range from 45 to 120 phr.

44. The rubber composition according to claim 43, wherein the total content of plasticizing system is in the range from 50 to 100 phr.

45. The rubber composition according to claim 44, wherein the total content of plasticizing system is in the range from 50 to 90 phr.

46. The rubber composition according to claim 1, wherein a ratio of the total content of reinforcing filler to the total content of the plasticizing system is in the range from 1.3 to 2.

47. The rubber composition according to claim 46, wherein the ratio of the total content of reinforcing filler to the total content of the plasticizing system is in the range from 1.3 to 1.8.

48. The rubber composition according to claim 47, wherein the ratio of the total content of reinforcing filler to the total content of the plasticizing system is in the range from 1.4 to 1.7.

49. A tire comprising a rubber composition according to claim 1.

50. The tire according to claim 49, wherein the rubber composition constitutes all or part of the tread.

* * * * *